Feb. 24, 1959 O. W. LUEDERS 2,875,278

SOCKET ADAPTER ARRANGEMENT

Filed Feb. 23, 1954 2 Sheets-Sheet 1

INVENTOR
OSCAR W. LUEDERS
BY

Feb. 24, 1959 O. W. LUEDERS 2,875,278

SOCKET ADAPTER ARRANGEMENT

Filed Feb. 23, 1954 2 Sheets-Sheet 2

INVENTOR
OSCAR W. LUEDERS
BY

United States Patent Office 2,875,278

Patented Feb. 24, 1959

2,875,278

SOCKET ADAPTER ARRANGEMENT

Oscar W. Lueders, Bergenfield, N. J.

Application February 23, 1954, Serial No. 411,966

8 Claims. (Cl. 179—1)

The present invention relates to electrical circuit arrangements and in particular to an arrangement for adapting the output stage of an electrical circuit for supplying amplified signals to an external circuit without having to rewire the output stage of the electrical circuit.

With present day radio and television sets when the radio set, or a television set, is turned on every individual in the room in which the radio set or the television set is located, is forced to listen to whatever program is on. That the turning on of such sets may be annoying to some individuals in the room, who are perhaps attempting to concentrate on other matters, is well known. The only recourse that the individuals not wishing to listen to such program have, is to leave the room.

It is an object of the present invention to adapt a radio or a television receiver to enable only the party desirous of hearing or viewing a program to listen to the same without disturbing other people who may be in the room.

Another object of the present invention is to provide an adapter permitting connection of an external circuit to a wired telecommunication receiver without having to rewire the receiver.

Still yet another object of the present invention is to provide an adapter which is easily constructed and simple to insert in the circuit of the telecommunication receiver so that any layman may adapt his receiver for the purposes outlined above.

Yet another object of the present invention is to provide an adapter for adapting the output stage of an electrical circuit for supplying amplified signals to an external circuit, which may comprise an output transformer connected to an inductive loop, without having to rewire the output stage of the electrical circuit.

With the above objects in view the present invention mainly consists of an arrangement for adapting an output stage including a first output tranformer of an electric circuit for supplying amplified signals to an external circuit without having to rewire the output stage of the electrical circuit, comprising a wired socket having electrically conductive lugs, a first and a second of the lugs being connected to the terminals of the output transformer of the output stage, an adapter having electrically conductive contact pins engaging the lugs of the wire socket, a tube socket forming part of the adapter and having electrically conductive lugs equal in number to the number of the contact pins of the adapter, all but one of the electrically conductive pins of the adapter being electrically connected to the electrically conductive lugs of the tube socket, a second output transformer, means for connecting the free contact pin of the adapter and the second lug of the wired socket to the second output transformer, a switch forming part of the external circuit, the switch being connected to the free lug of the tube socket, and an amplifier tube having contact pins equal in number to the lugs of the tube socket, the contact pins of the amplifier tube engaging the lugs of the tube socket.

With the above objects in view the present invention also mainly consists of an arrangement for tapping off electrical signals from the output stage of an electrical circuit for an external circuit without having to rewire the output stage comprising an adapter having an input and an output end, said input end comprising a cable plug having electrically conductive contact pins projecting from a bottom face of the cable plug, the end opposite the bottom face of the cable plug being formed with an opening, the output end comprising a tube socket a portion of which is arranged in the opening formed in the cable plug, the tube socket having electrically conductive lugs projecting towards the bottom end of the cable plug, a first and a second of the pins of the cable plug being adapted to be connected to the terminals of a first output transformer, the second pin also being adapted to be connected to a direct current voltage source, all but the first pin of the cable plug being connected to the electrically conductive lugs of the tube socket, a second output transformer, and a switch having fixed and movable contacts, one of the fixed contacts of the switch being connected to one terminal of the second output transformer, another of the fixed contacts of the switch being connected to the first pin of the cable plug, the second pin of the cable plug being connected to the other terminal of the second output transformer, the movable contact of the switch being connected to the free lug of the tube socket, whereby depending on the position of the movable contact of the switch, only the first output transformer will be connected to the output stage of an electrical circuit, or only the second output transformer will be connected to the output stage of an electrical circuit or both the first and second output transformers will be simultaneously connected to the output stage of an electrical circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2, 3:
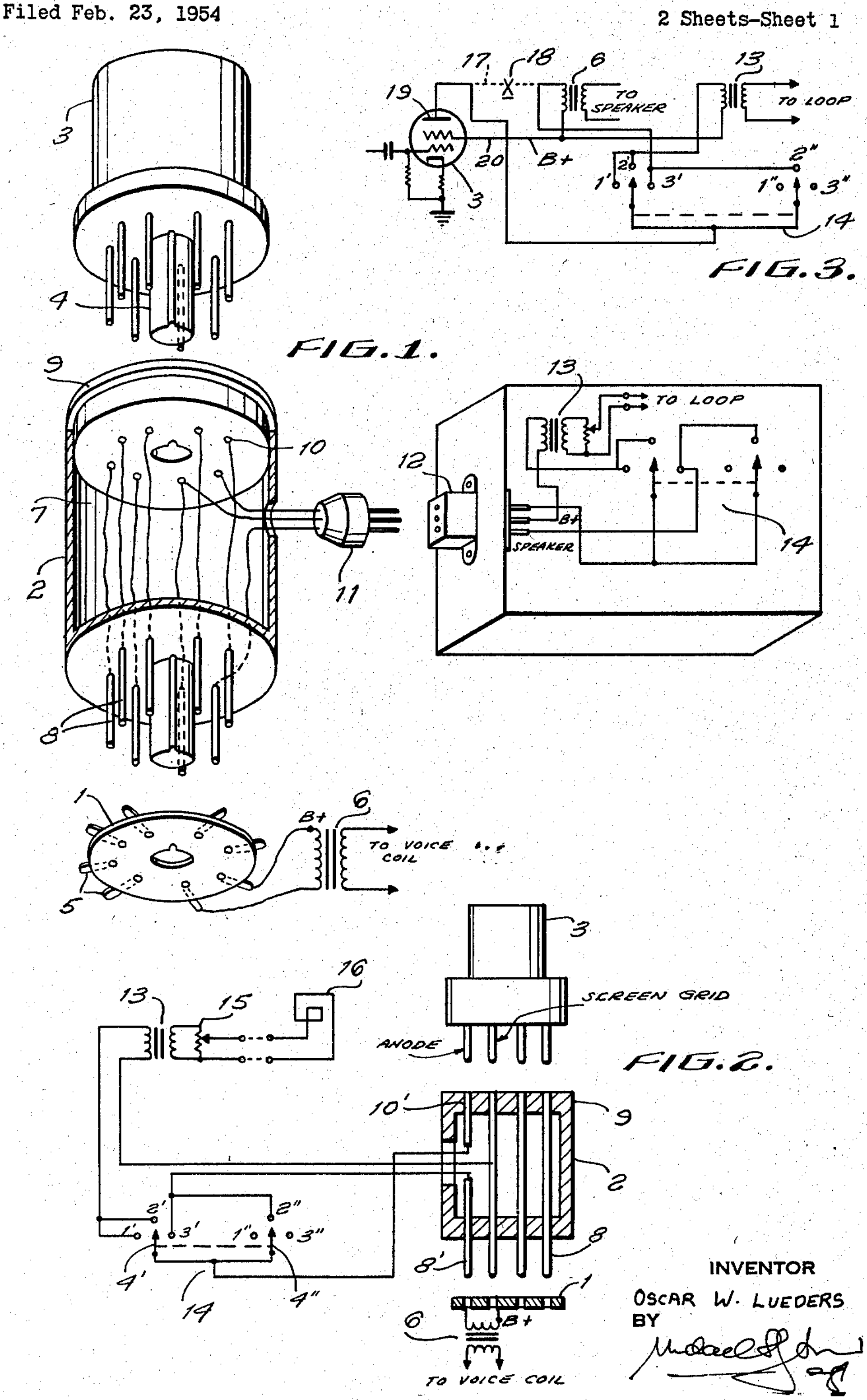
Fig. 1 is an arrangement, shown in perspective view, for adapting the output stage of an electrical circuit for connection to an external circuit in accordance with the present invention.
Fig. 2 shows the arrangement of Fig. 1 in schematic form.
Fig. 3 is a circuit diagram of the arrangement in accordance with the invention of Figs. 1 and 2, and useful for explaining the operation of the invention.

Referring to the drawing and first to Fig. 1, there is shown in Fig. 1 a tube socket 1, an adapter 2, and a power amplifier tube 3 which forms part of the final stage of the audio section of a radio or television receiver. The tube 3 is normally arranged in the socket 1 of the radio or television receiver, not shown, so that the prongs 4 of the tube 3 receive the voltages connected to the lugs 5 of the tube socket 1.

The wiring of only two of the lugs is shown for purposes of explaining the invention since it is well known how the remaining lugs 5 of the socket 1 are wired for a conventional power amplifier tube. Assuming that the power amplifier tube is a 6V6 power amplifier then its anode electrode and its screen grid electrode are respectively connected, in well known manner, to the third and fourth prongs of the amplifier tube. If the tube 3 is placed directly in the socket 1, as it is in a radio or television receiver, then it will be apparent from Fig. 1 that the primary winding of the audio output transformer 6 will be connected between the third and fourth prongs of the amplifier tube 3. As a result amplified currents will flow through the primary winding of the audio output transformer 6 resulting in a current being induced in the secondary winding of the audio output transformer 6, which secondary winding is connected to a voice coil of a speaker so that the amplified electrical signals may be converted to acoustical signals.

As already pointed out, there are times when not everyone in a room may wish to listen to the same program. In order to avoid discomfort of others and to enable only those individuals desiring to listen to a program to hear the same, all that need be done is to remove the tube 3 from its socket 1 and insert in its place the adapter 2. The tube 3 is then plugged into the adapter. The adapter itself has an input and an output end, the input end comprising a cable plug 7 having electrically conductive contact pins 8 projecting from a bottom face of the cable plug, the end opposite the bottom face of the cable plug being formed with an opening. The output end of the plug comprises a tube socket 9 which is similar to socket 1, the tube socket 9 being arranged in the opening formed in the cable plug. The tube socket 9 is provided with electrically conductive lugs 10 which project toward the bottom end of the cable plug of the adapter. All but one of the contact pins 8 of the cable plug 7 are connected to the lugs 10 of the socket 9. The reason for this will be explained hereinafter. A plug 11 and a female receptacle 12 serve to connect some of the voltages connected to the adapter 2, when plugged into socket 1, to an external circuit, which comprises another output transformer 13 and a switch 14, the function of which will be explained with reference to Fig. 2.

Referring now to Fig. 2, this figure shows only so much of the electrical connections between the output stage, the adapter, and the external circuit as is necessary to enable one skilled in the art to practice the invention.

The signal voltages connected to the lugs of the socket 1 will be connected to the tube 3 by means of the adapter 2 since all the pins of the adapter, excepting one, are connected to the lugs of the socket 9. The plate circuit of the tube 3 is, however, interrupted since the contact pin 8' of the adapter 2 is not directly connected to the lug 10' of the socket 9. Instead, the contact pin 8' is connected to the switch 14 at its fixed contact 3'. The switch 14 may be a double pole, two-wafer three-position switch. The movable contacts 4' and 4'' are mechanically ganged to enable movement thereof concurrently, and are electrically connected with each other, the movable contacts of switch 14 also being connected to the lug 10' of the socket 9. The B voltage received by said adapter 2, when plugged in the socket 1, is connected to the primary winding of the output transformer 13 at one terminal thereof, while the other terminal of the primary winding of the output transformer 13 is connected to the fixed contact 2' arranged on the same wafer as the fixed contact 1' of the switch. The fixed contact 3' is in turn connected to the fixed contact 2'' located on another wafer of the switch 14.

The secondary winding of the output transformer 13 has a variable resistor 15 connected in shunt therewith for level control, the movable arm of the resistor and one end terminal thereof being connected to the terminals of a loop antenna 16 for energizing the same.

The operation of the arrangement for adapting an output stage of an electrical circuit for supplying amplified signals to an external circuit will now be described with reference to Fig. 3.

The dotted line 17 in Fig. 3 represents the normal connection of the primary winding of the transformer 6 to the anode 19 of the amplifier tube 3, that is, the connection as made when the tube 3 is plugged directly into the socket 5 shown in Fig. 2 instead of in the socket 9 of the adapter 2. The $x$18 shown in Fig. 3 represents the breaking of the dotted line connection to the primary winding of the transformer 6, the dotted line connection being broken when the adapter 2 is placed in the socket 1 and the tube 3 is plugged into the socket 9 of the adapter 2 instead of into the socket 1. Since all the pins of the cable plug excepting for the pin which would normally be connected to the anode of the tube, are connected to the lugs of the socket 9, the electrodes of the amplifier tube will be directly supplied with the electrical signals connected to the lugs of the socket 5. The anode of tube 3 however is connected to the movable contact arms of switch 14 thereby enabling the output transformer 13 to be connected to the anode in a first position of the movable contact arms of switch 14, or enabling the connection of the audio output transformer 6 to the anode of the amplifier tube in another position of the movable contact arms of switch 14, or in still another position of the movable contact arms of switch 14, enabling the connection of both primary windings of transformers 6 and 13 to the anode of tube 3. Thus in the first position of switch 14 the speaker, not shown, of the radio receiver, not shown, will be disconnected from the receiver while transformer 13 is connected between the anode 19 and the screen grid 20 of tube 3 so that amplified currents flow through the primary winding of transformer 13 which induce in the secondary winding of transformer 13 a current which is adapted to energize an inductive loop adapted to be connected to the terminals of the secondary winding of transformer 13.

If the inductive loop is arranged within a limited space in a room and current flows through the inductive loop a magnetic field will be generated within said limited space.

The space within which the transmitted signals can be efficiently received lies within and around the inductive loop or it may be restricted to a region adjacent to the inductive loop when the size of the coil or loop is very large. If an individual stays within the confines of the magnetic field generated by current flow through the inductive loop, and further, if such individual has on his person receiving apparatus including a head phone and a pick-up coil, said individual will be capable of receiving audio signals which will be audible only to himself and not to others who may be present in the room.

If on the other hand switch 14 is thrown into the second position thereof then it is apparent from Fig. 3 that both of the primary windings of transformer 6 and transformer 13 will be connected simultaneously to the anode of tube 3. This switch position may be used in instances where an individual with portable receiving apparatus is confined to a first room which is distant from a second room in which a radio or television receiver is located, the first room being provided with an inductive loop which is connected to the output transformer 13. In this position of the switch the individual in the first room as well as the individual in the second room can simultaneously listen to a broadcast.

Finally, the third position of switch 14 may be used in those cases where an individual or a group wish to listen to the same program. In this position of the switch 14 only the loudspeaker, not shown, will be energized by the audio output transformer 6.

Preferably the receiving apparatus, employed by an individual located within the confines of the magnetic field generated by current flow through the inductive loop, consists of a portable battery operated receiver, of the type used by persons hard of hearing, and commonly referred to as hearing aids.

While the socket 1 has been shown and described as being an octal socket, it is apparent that other types of sockets may be used, such as sockets for four prong, five prong, or seven prong tubes. If the radio receiver uses a miniature output tube then of course the socket 5 and the adapter 2 will be designed accordingly.

It is also possible to use a single wafer switch instead of the double wafer switch 14, described herein, in which case the single wafer switch is constructed as to permit connection of the output transformer 13 to the anode 19 of the tube 3 in the first position of the switch 14, simultaneous connection of the primary windings of transformers 6 and 13 to the anode 19 of tube 3 in the second position of the switch, and in the third position of switch 14, connecting only the primary winding of the transformer 6 to the anode 19 of tube 3.

Figure 4:
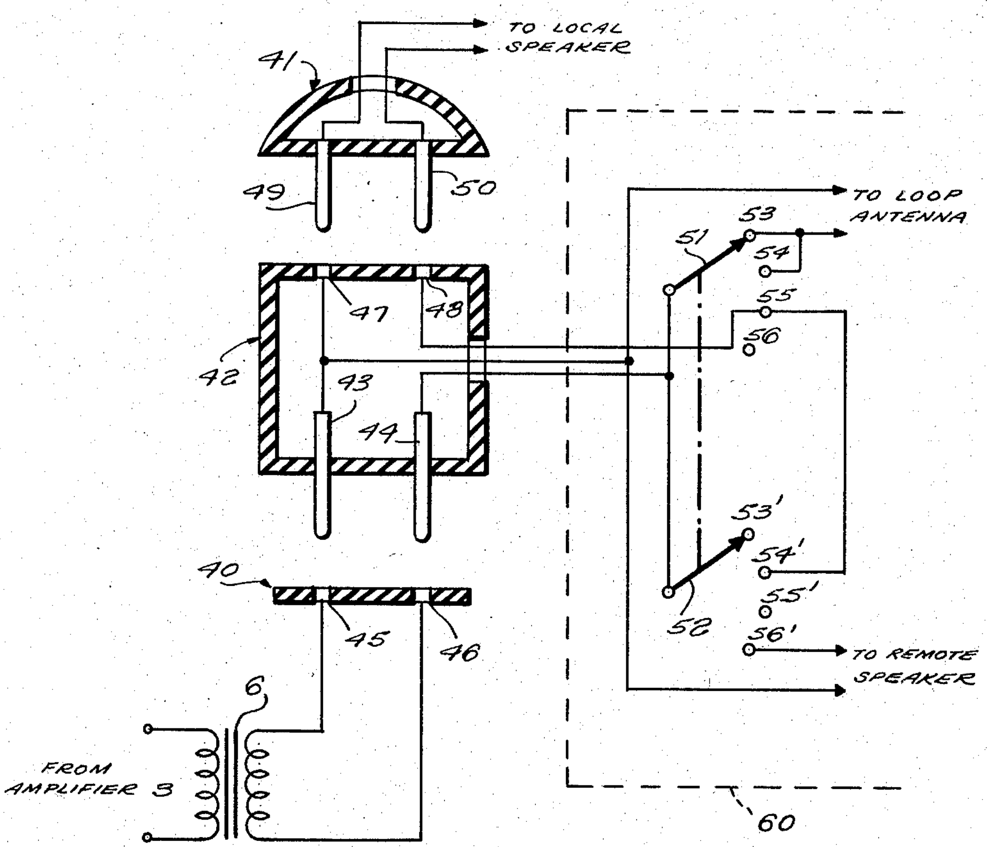
Fig. 4 is a view, partially in cross-section, and partially in schematic form of a second embodiment of the invention.

Referring now to Fig. 4, there is shown a second embodiment of the invention especially useful in television receivers or in any other type of radio receiver in which the loud speaker is connected to the output of the audio stage by means of a disconnectable coupling arrangement. In such an arrangement, the output of amplifier 3 is fed to the transformer 6 which is connected to the sockets 45, 46 in the insulated member 40. Normally, male plug 41 is positioned so that its pins 49, 50 engage the sockets 45, 46 and the audio signal is fed directly to the speaker.

In accordance with the invention, there is provided between the two parts 40, 41 an adapter plug 42 which has input pins 43, 44 adapted to engage sockets 45, 46 and output sockets 47, 48 adapted to be engaged by pins 49, 50. The output of the adapter plug is supplied to a device 60 similar to the right box shown in Fig. 1. There may be provided an adapter plug arrangement similar to 11, 12 (Fig. 1), however, for the sake of the explanation which follows, this has been omitted from the drawing. One side of the output transformer 6 is connected to the ganged movable switch arms 51, 52 and the other side of said output transformer is connected to one terminal of an inductive loop such as 16 (Fig. 2) and to one terminal of a remote speaker. Socket 48 is connected to terminal 55 and 54' of the ganged switches.

In operation, when the switch arms are in position 53, 53' the audio signal is fed directly to the inductive loop. It should be noted that since the inductive loop now follows the audio output transformer, it is no longer necessary to utilize a separate transformer 13 (Figs. 1–3). This provides a considerable saving of money.

When the switch arms are in position 54, 54' both the loop antenna and the local loudspeaker are energized. As previously explained, this permits the sound to be heard immediately adjacent the receiver and it also permits the remote listener to receive audio signals on his miniature receiver.

In position 55, 55' the receiver operates in the normal manner since only the local speaker is energized.

In the fourth position 56, 56' of the switch the audio output of transformer 6 is supplied only to a remote speaker. This additional position is employed for demonstration purposes or when it is desired to listen to the program at a remote location.

Although not shown, it should be understood that the invention is not limited to the utilization of a switch having three or four positions. For example, a fifth position may be provided so that one or more remote speakers may be energized simultaneously with the local speaker. Another switch position may be provided for the simultaneous energization of the inductive loop and one or more local or remote speakers.

It should also be understood that the invention is not limited to a receiver having a loud speaker. The invention is, of course, equally applicable to any type of audio transducer arrangement as, for example, a head set or similar device.

It will be understood that each of the elements described above, or two or more together, may also find a useful application in other types of circuits differing from the types described above.

While the invention has been illustrated and described as embodied in adapter arrangement for audio frequency circuits, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for adapting an output stage including an electrical circuit comprising a first output transformer and an amplifier tube having electrodes, for supplying amplified signals to an external circuit without having to rewire the output stage of the electrical circuit, comprising, in combination, a wired tube socket having a set of electrically conductive lugs; means connecting two of said lugs in circuit with the first output transformer of the output stage; a switch; a second output transformer having a secondary winding and a primary winding one terminal of which is connected to said switch, said secondary winding being adapted to be connected to an inductive transmission loop; an adapter having a set of contact pins respectively engaging said lugs of said wired socket; means for connecting said switch and the other terminal of said primary winding of said second output transformer, respectively, to the contact pins engaging said two lugs; and means for electrically connecting the remaining contact pins of said adapter directly, and said one terminal of said primary winding of said second output transformer through said switch to said electrodes of said amplifier tube.

2. An arrangement for adapting an output stage including a first output transformer of an electrical circuit for supplying amplified signals to an external circuit without having to rewire the output stage of the electrical circuit comprising, in combination, a wired socket having a set of electrically conductive lugs; means for connecting a first and a second of said lugs in circuit with the terminals of the output transformer of the output stage; an adapter having a set of electrically conductive contact pins respectively engaging said lugs of said wired socket; a tube socket forming part of said adapter and having a set of electrically conductive lugs equal in number to the number of said contact pins of said adapter, all but one of said electrically conductive pins of said adapter being electrically connected, respectively, to all but one of said electrically conductive lugs of said tube socket; a second output transformer; means, including a switch, for connecting the free contact pin of said adapter engaging said first lug, and the contact pin engaging said second lug of said wired socket, respectively, to said second output transformer, said switch being also connected to the free lug of said tube socket; and an amplifier tube having contact pins equal in number to said lugs of said tube socket, said contact pins of said amplifier tube engaging said lugs of said tube socket.

3. An arrangement for tapping off electrical signals from the output stage of an electrical circuit for an external circuit without having to rewire the output stage, comprising, in combination, an adapter having an input and an output end, said input end comprising a cable plug having a set of electrically conductive contact pins, said output end comprising a tube socket adapted to have the prongs of a tube inserted therein, said tube socket having a set of electrically conductive lugs, a first and a second of said pins of said cable plug being adapted to be connected to the terminals of a first output transformer, all but said first pin of said pins of said cable plug being connected, respectively, to said electrically conductive lugs of said tube socket; a second output transformer; a switch having fixed and movable contacts, one of the fixed contacts of said switch being connected to one terminal of said second output transformer; means for connecting another of said fixed contacts of said switch to said first pin of said cable plug, and for connecting said second pin of said cable plug to the other terminal of said second output transformer; and means for connecting the movable contact of said switch to the free lug of said tube socket, whereby depending on the position of said movable contact of said switch, either only the first output transformer will be connected to the output stage of said electrical circuit, or only said second output transformer will be connected to the output stage of said electrical circuit.

4. An arrangement for tapping off electrical signals from an output stage of an electrical circuit without having to rewire the output stage comprising, in combination, an adapter having an input and an output end, said input end comprising a cable plug having a set of electrically conductive contact pins projecting from a bottom face of said cable plug, the end opposite said bottom face of said cable plug being formed with an opening, said output end comprising a tube socket a portion of which is arranged in said opening formed in said cable plug, said tube socket having a set of electrically conductive lugs projecting towards the bottom end of said cable plug, a first and a second of said pins of said cable plug being adapted to be connected to the terminals of a first output transformer, all but said first pin of said pins of said cable plug being connected, respectively, to said electrically conductive lugs of said tube socket; a second output transformer; and a switch having fixed and movable contacts, one of the fixed contacts of said switch being connected to one terminal of said second output transformer; means for connecting another of said fixed contacts of said switch to said first pin of said cable plug; means for connecting said second pin of said cable plug to the other terminal of said second output transformer; means for connecting the movable contact of said switch to the free lug of said tube socket, whereby depending on the position of said movable contact of said switch, only the first output transformer will be connected to the output stage of said electrical circuit, or only said second output transformer will be connected to the output stage of said electrical circuit.

5. An arrangement for tapping off electrical signals from the output stage of an electrical circuit for an external circuit without having to rewire the output stage comprising, in combination, an adapter having an input and an output end, said input end comprising a cable plug having a set of electrically conductive contact pins, said output end comprising a tube socket adapted to have the prongs of a tube inserted therein, said tube socket having a set of electrically conductive lugs, a first and a second of said pins of said cable plug being adapted to be connected to the terminals of a first output transformer, all but said first pin of the pins of said cable being connected, respectively, to said electrically conductive pins of said tube socket; a second output transformer having a primary and a secondary winding; an inductive transmission loop connected in circuit with said secondary winding; a switch having fixed and movable contacts, one of the fixed contacts of said switch being connected to one terminal of said primary winding of said second output transformer; means for connecting another of said fixed contacts of said switch to said first pin of said cable plug, and for connecting said second pin of said cable plug to the other terminal of said primary winding of said second output transformer; and means for connecting the movable contact of said switch to the free lug of said tube socket forming the output end of said adapter, whereby depending on the position of said movable contact of said switch, only the first output transformer will be connected to the output stage of said electrical circuit or only said second output transformer will be connected to the output stage of said electrical circuit.

6. In a radio receiver having an audio output stage the output of which is supplied to one of the parts of a two part disconnectable coupling arrangement, and an audio transducer coupled to the other of the parts of said two part disconnectable coupling arrangement, the combination comprising an adapter plug having an input end adapted to engage said one part of said coupling arrangement and an output end adapted to engage said other part of said coupling arrangement; electromagnetic induction means; and switch means coupled to said adapter plug for connecting in one position thereof the output stage solely to said induction means, and in a second position thereof the output stage to both said audio transducer and said induction means, and in a third position thereof the output stage solely to said audio transducer.

7. In a radio receiver having an audio output stage the output of which is supplied to a pair of terminals in one part of a two part disconnectable coupling arrangement, and a loudspeaker coupled to a pair of complementary terminals in the other of the parts of said two part disconnectable coupling arrangement, the combination comprising an adapter plug having a pair of input terminals adapted to engage the pair of terminals in said one part of said coupling arrangement and a pair of output terminals adapted to engage the terminals in said other part of said coupling arrangement, one of said input terminals being conductively connected to one of said output terminals; a pair of like, ganged switches, each including a switch arm; an inductive transmission loop having two input terminals, one of said loop input terminals being connected to the first and the second positions of one of said switches and the other of said loop input terminals being connected to the conductive connection between said one input terminal on said adapter plug and said one output terminal on said adapter plug; said other input terminal on said adapter plug being connected to both of said ganged switch arms, and said other output terminal on said adapter plug being connected to the third position of said one of said switches and the second position of the other of said switches.

8. An arrangement for tapping off electrical signals from the output stage of an electrical circuit for an external circuit without having to rewire the output stage, comprising, in combination, an adapter having an input and an output end, said input end comprising a cable plug having a set of electrically conductive contact pins, said output end comprising a tube socket adapted to have the prongs of a tube inserted therein, said tube socket having a set of electrically conductive lugs, a first and a second of said pins of said cable plug being adapted to be connected to the terminals of a first output transformer, all but said first pin of said pins of said cable plug being connected, respectively, to said electrically conductive lugs of said tube socket; a second output transformer; a ganged switch having two sets of fixed contacts and two movable contacts respectively associated with said sets of fixed contacts, a first and second of said fixed contacts of one set being connected to one terminal of said second output transformer, the second set comprising at least one fixed contact, said one fixed contact of said second set being permanently connected with a third fixed contact of said first set, and said two movable contacts being permanently connected with each other; means for connecting said third fixed contact of said first set to said first pin of said cable plug, and for connecting said second pin of said cable plug to the other terminal of said second output transformer; and means for connecting said movable contacts of said switch to the free lug of said tube socket, whereby depending on the position of said movable contact of said switch, either only the first output transformer will be connected to the output stage of said electrical circuit, or only said second output transformer will be connected to the output stage of said electrical circuit or both said first and second output transformers will be simultaneously connected to the output stage of said electrical circuit.

References Cited in the file of this patent

UNITED STATES PATENTS

| | | |
|---|---|---|
| 1,790,636 | Hollister | Jan. 27, 1931 |
| 1,844,583 | Leishman | Feb. 9, 1932 |
| 1,852,424 | Leishman | Apr. 5, 1932 |
| 1,934,498 | Guedon | Nov. 7, 1933 |
| 1,986,269 | Jermain | Jan. 1, 1935 |
| 2,567,431 | Halstead | Sept. 11, 1951 |
| 2,655,565 | Thompson | Oct. 13, 1953 |